Patented June 27, 1939

2,163,723

UNITED STATES PATENT OFFICE 2,163,723

CELLULOSE DERIVATIVES AND METHOD OF PREPARING SAME

William Whitehead, Cumberland, Md., assignor to Celanese Corporation of America, a corporation of Delaware No Drawing. Application November 23, 1937, Serial No. 176,067

6 Claims. (Cl. 260—231)

This invention relates to improvements in the manufacture of cellulose derivatives and particularly to improvements in the manufacture of cellulose hydroxy ethers.

An object of the invention is the economic and expeditious production of cellulose ethers. Another object of the invention is the production of water-soluble cellulose hydroxy ethers that are substantially free of inorganic materials and polyglycols. A still further object of the invention is the production of cellulose hydroxy ethers which are white and which when dissolved in water form clear solutions, or when cast from an aqueous solution on to a surface form water-clear films. Other objects of this invention will appear from the following detailed description.

The usual methods for the manufacture of cellulose ethers consist in reacting cellulosic materials with etherifying agents containing the radicals of inorganic acids, for example dimethyl sulphate or ethyl chloride, in the presence of caustic soda or other strong inorganic bases. This method, however, while capable of giving a good yield of the cellulose ether, has the disadvantage that it also produces considerable amounts of products which are degraded. Furthermore, it is almost impossible to remove from the cellulose ether the inorganic base and salts or other materials formed during the reaction. By employing this invention, which comprises etherifying cellulose in the presence of an organic base, the formation of polyglycols or other degraded products is substantially avoided and the separation of the cellulose ether from the base and the products formed during the reaction is comparatively simple.

By employing this invention, a substantially pure, clear cellulose ether may be produced. Due to the fact that the base employed during the formation of the ether, as well as the by-products, can be removed from the cellulose ether, the cellulose ether produced is more stable than those made by prior processes.

In accordance with my invention, I prepare cellulose ethers, and particularly cellulose hydroxy ethers, by reacting the cellulose with the etherifying agent in the presence of a quaternary substituted ammonium base as the base necessary to effect etherification. The base may be any suitable quaternary substituted ammonium base, such as quaternary alkyl-aryl ammonium hydroxide an example of which is trimethyl benzyl ammonium hydroxide, quaternary alkyl ammonium hydroxide an example of which is tetra n-propyl ammonium hydroxide, and quaternary aryl ammonium hydroxide an example of which is tetra benzyl ammonium hydroxide. Further examples of suitable quaternary ammonium bases are dimethyl dibenzyl ammonium hydroxide, trimethyl phenylmethyl ammonium hydroxide, trimethyl cresyl ammonium hydroxide, tetramethyl ammonium hydroxide, triethyl benzyl ammonium hydroxide, tetra isopropyl ammonium hydroxide, cyclo butyl trimethyl ammonium hydroxide, etc.

This invention is equally applicable to the preparation of alkali soluble or water soluble ethers. For example, the ethylene oxide or other etherifying agent employed may be the equivalent of one mol or less as, for example, 0.4 or it may be above 1.75 mols for each $C_6H_{10}O_5$ of the cellulose molecule. The low ether value results in insolubility in water but solubility in aqueous alkali solutions, in which case the ether may be employed for printing pastes, padding or otherwise applying to fabrics as a parmanent carrier of effects such as metallic effects or as a permanent dressing or sizing. In such cases the finish after application is washed with an acid solution or is flushed with water to remove the alkali and precipitate the ether. The water soluble form of ether may be employed as a dispersion means for dyestuffs, for example, those dyestuffs having an affinity for organic derivatives of cellulose may be ground down in a ball mill in a 10 to 15% aqueous solution of the soluble ether. This dispersion may be diluted or added to a dye bath, as desired, to control the amount of color and shade to be applied to organic derivative of cellulose fabrics. The further use of the water soluble ether is as a sizing material for warps, especially warps formed of organic derivative of cellulose yarns, such as cellulose acetate yarns.

The process of the present invention is applicable to the etherification of unsubstituted cellulosic materials, for example, cotton, cotton linters, wood pulp or regenerated cellulose, or cellulosic materials which already contain substituent groups and also free hydroxy groups or yield them under the conditions of reaction as, for example cellulose esters and partially etherified cellulose ethers. The process is applicable to the etherification of cellulosic materials in any suitable form. For instance, cellulosic materials may be in the form of fibers, tissues, felts, crumbs or similar forms, or the cellulosic materials may be in the form of yarns, fabrics, foils and other articles. The process may be employed for the production of alkyl ethers of cellulose by using, for example, dimethyl sulphate or ethyl chloride as etherifying agent, for the production of aralkyl ethers using, for example, benzyl chloride, or, more particularly, for the production of hydroxy substituted or carboxy substituted cellulose ethers using, for example, epichlorhydrin, ethylene chlorhydrin, glycerol chlorhydrin, cyclohexene chlorhydrin, chlor acetic acid, ethyl chloracetate, ethylene oxide, propylene oxide, glycide, cyclohexene oxide or a methyl cyclohexene oxide. Preferably the etherification is carried out in the presence of as little water as possible. For example, very valuable results may be obtained by etherifying under such conditions that the water, if present, does not exceed more than 10 times the weight of the cellulose, while the rest of the liquids present are acetone or other like compounds. If a low viscosity product is desired, the cellulose after treatment with the quaternary substituted ammonium base is aged for a period of from a few hours to ten or more days depending upon the viscosity desired. The longer the treated cellulose stands the less viscous will be the product.

Obviously the amount of base employed will vary with etherifying agent employed. When employing ethylene oxide or propylene oxide, for example, the amount of quaternary substituted ammonium base employed will be about five times the weight of the cellulosic material. Although about five times the weight of the cellulosic material is preferred, the amount of base which may be employed may vary from 2 to 10 or more times the weight of the cellulosic material.

The etherification may be effected in the presence of a diluent. Examples of suitable diluents which may be employed are acetone, alcohol, benzene, toluene, xylene and other aromatic hydrocarbons or aliphatic hydrocarbons.

Etherification may be carried out at relatively low temperatures, for example, ordinary atmospheric temperature or temperatures up to 25 or 35° C. However, high temperatures, e. g. temperatures of 50 to 70° C. or more may be employed. The temperature employed depends upon the nature of the etherifying agent used and the conditions under which the quaternary substituted ammonia base is a liquid.

The etherification may be effected by allowing the cellulosic material to remain in contact with the quaternary substituted ammonia base and the etherifying agent in a closed vessel under pressure, if desired, and with or without agitation, until the desired degree of etherification is attained, or the organic base and/or the etherifying agent may be continuously circulated through the material.

The etherification may be carried out under such conditions that the cellulose ether is obtained in fibrous form, or a diluent may be employed which is a solvent for the cellulose ether, in which case the ether may be precipitated from the solution on completion of etherification, for example by introducing the solution into a non-solvent for the cellulose ether. The ether after separation from the other constituents of the reaction mixture may be washed with a suitable liquid and dried. When the cellulose ether is to be employed as a size, as a constituent of printing pastes and like coating compositions, it may be ripened to the desired viscosity by allowing it to stand in contact with the liquor produced in the etherification process.

The process of the present invention may be continued until etherification is substantially complete giving water-soluble products or may be interrupted at any suitable stage, for example to a point where less than 1 to 2 ether groups are formed for each $C_6H_{10}O_5$ group of the cellulose molecule. Cellulose ethers, obtained according to the present invention, which contain free hydroxy groups may be further treated. For example, they may be esterified with acetic anhydride, acetyl chloride or other acid anhydride or acid halide in order to produce cellulose ether-esters.

Cellulose derivatives obtained according to the present invention may be employed in the production of artificial filaments, films and similar products, or for the manufacture of coating compositions, plastic masses and other industrial products. The water-insoluble materials may be employed as fillers in coating materials on cotton fabric or other types of fabric to add weight thereto and to change the texture thereof. The water-soluble cellulose ethers, especially the cellulose hydroxy ethers, may be employed as an adhesive or body giving material in sizes for application to warps and other yarns. These cellulose ethers may also be employed in paints, lacquers and other coating compositions.

As a means of describing this invention, but without being limited thereto, the following example is given:

Example

About 5 parts of wood pulp (light bleach) are treated for about 3 hours at 20° C. with 60 parts of a 40% by weight concentration of an aqueous solution of trimethyl benzyl ammonium hydroxide. The wood pulp immediately forms an opaque gel. About 36 parts of ethylene oxide in acetone (40% by weight solution) is added while stirring. After about 2 hours a clear amber colored gel is formed. The material is substantially sealed from the air and allowed to stand for about 6 to 8 days to ripen. After standing for this period of time water is added to dissolve the material and form a thin syrup. The mixture is then acidified with acetic acid or other acid and precipitated by pouring the solution in the form of a thin stream into about 10 times its volume or weight of acetone accompanied by rapid stirring. The precipitate is then separated from the mother liquor, washed clean with acetone and air dried. There is produced a white fibrous product that is neutral and gives a very viscous, clear solution in water with substantially no undissolved fibers. The material does not reduce Fehling's solution. This material is suitable for the production of sizes for sizing warp yarns of cellulose acetate. The size may be formed by adding this material to glycols or glycerols and suitable diluents.

It is to be understood that the foregoing detailed description is merely given by way of example and that many variations may be made therein without departing from the spirit of my invention.

Having described my invention, what I desire to secure by Letters Patent is:

1. Process for the production of cellulose ethers, which comprises treating cellulosic materials with a quaternary substituted ammonium base and then reacting the so-treated materials with an etherifying agent in the presence of an organic diluent.

2. Process for the production of cellulose ethers, which comprises treating cellulosic materials with trimethyl benzyl ammonium hydroxide and then reacting the so-treated cellulosic material with an alkylene oxide in the presence of a non-aqueous organic diluent.

3. Process for the production of cellulose ethers of low viscosity, which comprises treating cellulosic materials with a quaternary substituted ammonium base, ageing the so-treated cellulosic materials and then reacting the aged cellulosic materials with an etherifying agent in the presence of an organic diluent.

4. Process for the production of cellulose ethers of low viscosity, which comprises treating cellulosic materials with trimethyl benzyl ammonium hydroxide, ageing the so-treated cellulosic materials and then reacting the aged materials with an alkylene oxide in the presence of a non-aqueous organic diluent.

5. Process for the production of cellulose ethers of low viscosity, which comprises treating wood pulp with trimethyl benzyl ammonium hydroxide, ageing the so-treated wood pulp for at least a few hours and then reacting the aged wood pulp with an alkylene oxide in the presence of a non-aqueous organic diluent.

6. Process for the production of cellulose ethers of low viscosity, which comprises treating cellulosic materials with trimethyl benzyl ammonium hydroxide, ageing the so-treated cellulosic materials and then reacting the aged materials with ethylene oxide in the presence of acetone.

WILLIAM WHITEHEAD.